March 7, 1939.  C. T. BARD  2,150,046
CORER
Filed May 13, 1938
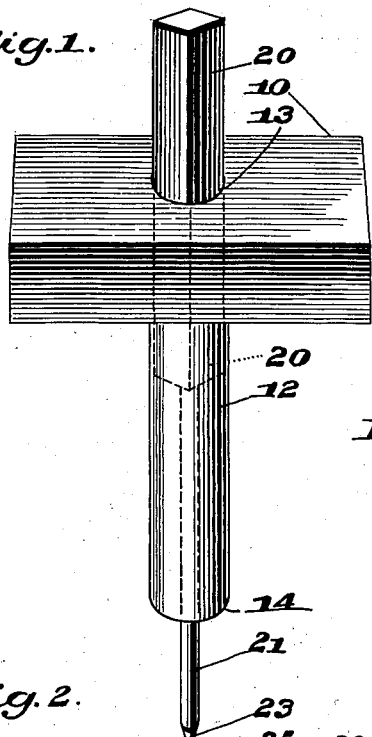
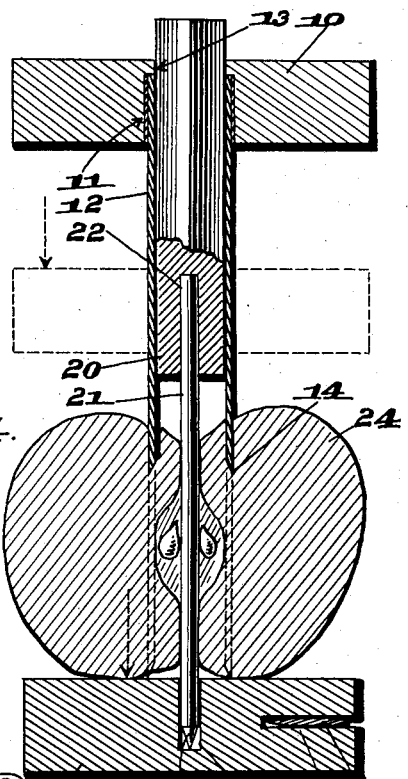
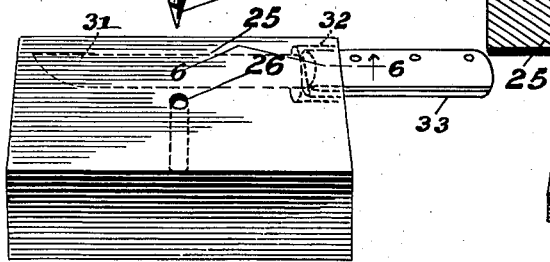
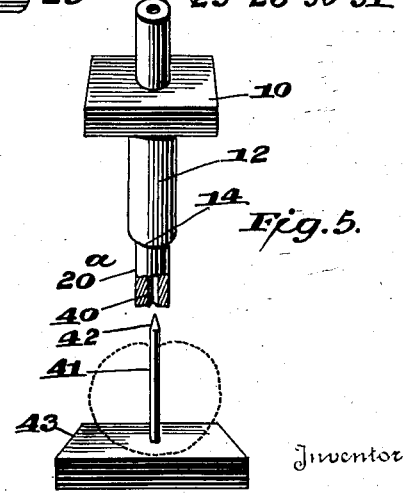
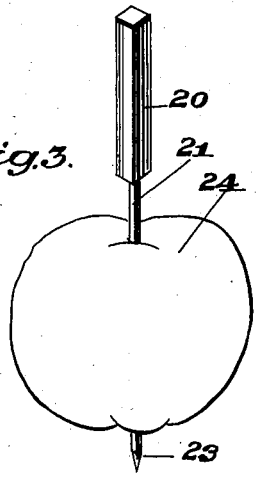
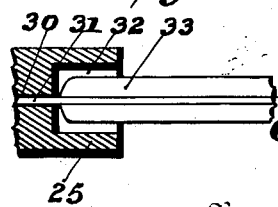
Inventor
Charles T. Bard
By Munn, Anderson & Liddy
Attorneys Patented Mar. 7, 1939

2,150,046

UNITED STATES PATENT OFFICE 2,150,046

CORER

Charles Tyler Bard, Gales Ferry, Conn.

Application May 13, 1938, Serial No. 207,828

7 Claims. (Cl. 30—278)

This invention relates to a fruit corer.

It has been proposed to provide corers having a base which is provided with a sharp pointed member for penetrating the lower end of the fruit with a mechanical means for guiding a cylindrical corer member through the apple. However, in these types of devices the sharp pointed member merely penetrates the lower portion of the fruit but it does not hold the axis of the core of the fruit in alignment with the axis of the cylindrical cutter so that when the cutter is forced through the apple it will leave portions of the core in the apple due to the fact that the core cannot be severed in alignment with the axis of the corer because of the irregularities in apples. In this type of fruit one end of the corer may be centrally disposed while the opposite end is eccentric with respect to the center.

An object of the invention is the provision of a corer having a centering device which may be forced through the axis of the core and project beyond the opposite face of the apple for receiving a guide upon which is slidably mounted a cylindrical corer so that when the corer is forced through the apple it will remove all of the core, the guide acting as a plunger for forcing the core from the cylindrical member after the core has been removed.

Another object of the invention is the provision of a device for removing cores of fruits in which a pin or sharp-pointed relatively thin, elongated member is adapted to be forced through the axis of the core with a sufficient portion projecting from the apple to receive a guide upon which a cutting sleeve is slidably mounted so that when a handle or other means is forced along the guide it is centered by the guide which in turn is located axially of the core of the fruit so that the cylindrical member will embrace the core of the fruit and remove it entirely when the cylindrical member has been forced through the fruit and then removed.

A further object of the invention is the provision of a corer for fruits in which the corer is in the form of a hollow elongated member having a knife edge at one end for cutting through the fruit and for embracing the core, said cylindrical member being guided in a predetermined manner through the fruit with the walls of said member being spaced equi-distant from the axis of the core by a guide upon which the cylindrical member is slidably mounted and a pin passing through the axis of the core and projecting beyond one end of the fruit.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a corer constructed in accordance with the principles of my invention, Figure 2 is a base member adapted to cooperate with the corer shown in Fig. 1, Figure 3 is a view in perspective of a centering rod or pin having a guide connected to the upper end, Figure 4 is a vertical section of the corer shown in position for penetrating an apple in embracing relation with all of the core of the fruit, Figure 5 is a view in perspective of a modified form of the corer shown in Figs. 1 to 4, inclusive, and Figure 6 is a framentary vertical section taken along the line 6—6 of Figure 2.

Referring more particularly to the drawing, 10 designates a handle which may be of any shape suitable for the purpose but in this instance it is shown in the form of a rectangular block. This block is provided with a pocket 11 adapted to receive the upper end of a cylindrical cutter 12 and this end of the cutter is secured to the walls of the pocket in any approved manner. The inner end of the pocket opens into a passage 13 which extends through the upper end of the handle 10.

The cutter 12 is shown as a cylinder or long tube and has its lower end sharpened to provide a knife edge 14. While this core removing element 12 is shown as cylindrical it will be appreciated that it may assume any other form in cross sectional area which will remove a core. The cutting edge it will be noted is beveled from the inside instead of having the external surface beveled inwardly to the cutting edge because the last-mentioned form of cutting edge tends to expand and break the fruit, particularly those kinds of fruits which are readily split, such as apples. The cutting edge disclosed herein exerts a pressure on the core and eliminates pressure on the body of the fruit externally of the core.

A guide member 20 is adapted to be received by the member 12 and may be either cylindrical or polygonal in cross sectional area. In the present instance, however, it is shown as square in cross sectional area with the longitudinal edges being in neat contact with the inner walls of the cylindrical member 12 so that said member will be guided along an axis depending upon the position of the axis of the guide 20.

A rod 21 is located within a socket 22 formed in the lower end of the guide 20 and is secured thereto. The axis of the rod 21 is located in vertical alignment with the axis of the guide 20. The lower or free end of the rod 21 is pointed, as shown at 23, to facilitate penetration of the core of a fruit, as shown at 24.

A base block 25 is adapted to be placed beneath the apple or fruit so that when the sharp pointed rod 21 has been forced through the axis of the core of the fruit it will project beyond the opposite face of the apple and be received by an opening 26 formed in the base member 25.

The block may have any suitable configuration but in this instance it is rectangular in shape and provided with an elongated slot 30 to receive a blade 31 of a paring knife. One end of the block is provided with a pocket 32 at one end of the slot to receive the inner end of a handle 33. By this construction the slot 30 forms a neat receptacle for the blade 31 so that the paring knife will be in a convenient position for the operator of the corer.

In order to remove a core of a fruit by the device just described the opposite ends of the fruit are inspected to determine the position of the opposite ends of the core. The pointed end 23 of the rod 21 is then forced through the axis of the fruit until it passes entirely through the fruit and beyond the same. By this sharp pointed rod the operator of the corer may predeterminately position the rod and likewise the guide member 20 along the axis of the fruit in advance of the coring operation.

The sleeve 12 is then placed on the upper end of the guide member 20 and forced downwardly whence it will be guided axially of the core and when sufficient pressure is applied to the member 10 and the knife edge 14 will penetrate the fruit, as shown in Fig. 4. Continued downward pressure will force the cylindrical member 12 entirely through the fruit and sever the core from the fruit. At this time the sharp pointed end 23 of the rod 21 is located within the pocket 26 of the base member 25 with the fruit 24 resting on said base member. The base member gives the advantage of receiving the point 23 of the rod 21 while supporting the apple and forming a fixed support against which pressure is exerted when the handle 10 and likewise the sleeve 12 is forced downwardly until the cutting member 14 engages the upper face of the base member 25. By the use of the base member 25 the operator has a base to protect the table or other piece of furniture from injury by the point 23 and the cutting edge 14. During the downward descent of the cylindrical member 12 it is guided positively by the guide member 20 and the rod 21.

When the sleeve or cylindrical member 12 is withdrawn from the apple or other fruit the core will be removed intact from the fruit and the guide member 20 may be employed as a plunger for forcing the core from the sleeve 12.

In the modified form shown in Fig. 5 the same elements are employed and the device functions in substantially the same manner. In this case the sleeve 12 is likewise guided by the member 20a when the handle 10 is forced downwardly.

The guide member, however, is provided with an axial passage 40 which is adapted to receive a pin 41 having a point 42 for penetrating a fruit. The pin or rod 41 is secured in this instance directly in the base member 43.

In the modified form the pin or rod 41 is forced through the axis of the core of the fruit by means of the base member 43. The passage 40 of the guide 20a is received by the pointed end of the rod 41 so that the guide 20a has its axis located in longitudinal alignment with the axis of the rod 41 and likewise the axis of the core of the fruit. The member 10 is then forced downwardly and is guided by the member 20a so that the cutting edge 14 of the member 12 will cut through the apple in embracing relation with the core so that the core will be entirely severed from the fruit.

After the core has been removed by the removal of the sleeve 12 from the fruit the member 20a may be operated as a plunger for separating the core from the sleeve 12.

While I have described and illustrated in the drawing a device for coring a single fruit, it will be appreciated that by increasing the length of the rods 21 and 41, the guide 20 or 20a and also by increasing the length of the cutting sleeve 12 a number of fruits may be cored in a consecutive manner by a single reciprocating movement of the corer sleeve since the lengthened sharp-pointed rod 41 or 21 may penetrate the cores of a number of fruits until the sharp-pointed end will project beyond the outermost end of the last fruit centered on the rod. The corer sleeve will then be guided by the centering rod successively through the plurality of fruits upon the rod.

I claim:

1. A corer comprising a centering rod adapted to be forced axially through the core of a fruit, a guide at one end of the rod, a corer sleeve received by the guide, and means for forcing said sleeve through the fruit as it is guided axially by the rod.

2. A corer comprising a centering rod adapted to be forced axially through the core of the fruit, a guide formed at one end of the rod, a tubular blade neatly received by the guide and adapted to be forced through the fruit and directly axially of the fruit by the guide and rod, a handle connected to the upper end of the knife for forcing said knife through the fruit.

3. A corer comprising a centering means adapted to be forced axially through the core of the fruit, a tubular knife adapted to be forced through the fruit for removing the core of said fruit, means on the centering means for guiding the knife axially of the core, and means connected with the knife for forcing said knife through the fruit.

4. A corer comprising a centering rod adapted to be forced axially through the core of a fruit, a guide adapted to be received by the projecting end of the rod, a corer sleeve received by the guide, and means forcing said sleeve through the fruit as it is guided axially by the rod.

5. A corer comprising a centering rod adapted to be forced axially through the core of a fruit and beyond one end of said core, a base having a pocket to receive the projecting end of the rod, said base supporting the fruit to be cored, a guide at the other end of the rod, a sleeve having a knife edge at one end and slidably received by the guide, and means connected with the sleeve for causing reciprocation of said sleeve.

6. A corer comprising a centering rod adapted to be forced axially through the core of a fruit and beyond one end of said core, a base having a pocket to receive the projecting end of the rod, said base supporting the fruit to be cored, a guide at the other end of the rod, a sleeve having a knife edge at one end and slidably received by the guide, a handle having a passage therethrough in which the guide is adapted to slide, said passage including a socket in which one end of the sleeve is secured.

7. A corer comprising a centering rod having a point for axial penetration of a core of a fruit, a base member secured to the opposite end of the rod for forcing said rod through the core until said rod projects beyond the opposite end of the core, a guide, a sleeve having a knife edge at one end slidably mounted on the guide and adapted to be forced through the fruit axially of the core.

CHARLES TYLER BARD.